US012288656B2

(12) United States Patent
Aihara et al.

(10) Patent No.: US 12,288,656 B2
(45) Date of Patent: Apr. 29, 2025

(54) VACUUM INTERRUPTER

(71) Applicant: Mitsubishi Electric Corporation, Tokyo (JP)

(72) Inventors: Naoya Aihara, Tokyo (JP); Taiki Donen, Tokyo (JP); Yasutomo Otake, Tokyo (JP); Katsuya Jinno, Tokyo (JP); Hiromi Koga, Tokyo (JP); Shinichi Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 186 days.

(21) Appl. No.: 18/014,173

(22) PCT Filed: May 31, 2021

(86) PCT No.: PCT/JP2021/020710
§ 371 (c)(1),
(2) Date: Jan. 3, 2023

(87) PCT Pub. No.: WO2022/030086
PCT Pub. Date: Feb. 10, 2022

(65) Prior Publication Data

US 2023/0260725 A1 Aug. 17, 2023

(30) Foreign Application Priority Data

Aug. 5, 2020 (JP) ................................ 2020-132939

(51) Int. Cl.
*H01H 33/662* (2006.01)
*H01H 33/664* (2006.01)
*H01H 33/666* (2006.01)

(52) U.S. Cl.
CPC ........ *H01H 33/662* (2013.01); *H01H 33/664* (2013.01); *H01H 33/666* (2013.01); *H01H 2033/66269* (2013.01)

(58) Field of Classification Search
CPC .. H01H 33/662; H01H 33/664; H01H 33/666; H01H 2033/6623; H01H 2033/66284
(Continued)

(56) References Cited

U.S. PATENT DOCUMENTS 6,130,394 A * 10/2000 Hogl ................ H01H 33/66207 218/138
6,437,274 B2 * 8/2002 Claessens .......... H01H 33/6661 218/3
(Continued)

FOREIGN PATENT DOCUMENTS

JP 58-189927 A 11/1983
JP 60-75940 U 5/1985
(Continued)

OTHER PUBLICATIONS

Extended European Search Report issued Apr. 22, 2024, in corresponding European Patent Application No. 21852484.1, 8pp.
(Continued)

*Primary Examiner* — William A Bolton
(74) *Attorney, Agent, or Firm* — XSENSUS LLP

(57) ABSTRACT

A vacuum interrupter according to the present disclosure is configured such that a linear resistive layer and a nonlinear resistive layer are disposed so as to cover at least a part of a periphery of an insulation container, and a magnitude relationship of each resistivity is R1>R3>R2, where a resistivity of the nonlinear resistive layer less than an operating electric field is R1, a resistivity less than or equal to an impedance when a lightning impulse is applied is R2, and a resistivity of the linear resistive layer is R3.

20 Claims, 8 Drawing Sheets

(58) Field of Classification Search
USPC ............... 218/136, 134, 138, 139, 155, 140; 200/48 R
See application file for complete search history.

(56) References Cited

U.S. PATENT DOCUMENTS

| | | | | |
|---|---|---|---|---|
| 8,785,802 | B2 * | 7/2014 | Shang | H01H 33/66207 218/120 |
| 9,190,231 | B2 * | 11/2015 | Borgstrom | H01H 33/662 |
| 9,508,507 | B2 * | 11/2016 | Yoshimura | H01H 33/24 |
| 9,633,802 | B2 * | 4/2017 | Chapelle | H01H 11/04 |
| 10,102,989 | B2 * | 10/2018 | Hartmann | H01H 33/662 |
| 2021/0327666 | A1 * | 10/2021 | Benkert | H01H 33/66261 |

FOREIGN PATENT DOCUMENTS

| | | | |
|---|---|---|---|
| JP | 63-205020 | A | 8/1988 |
| JP | 3-179627 | A | 8/1991 |
| JP | 4-65041 | A | 3/1992 |
| JP | 2010-73459 | A | 4/2010 |

OTHER PUBLICATIONS

International Search Report and Written Opinion mailed on Aug. 3, 2021, received for PCT Application PCT/JP2021/020710, filed on May 31, 2021, 8 pages including English Translation.

* cited by examiner

VACUUM INTERRUPTER

CROSS-REFERENCE TO RELATED APPLICATION

The present application is based on PCT filing PCT/JP2021/020710, filed May 31, 2021, which claims priority to JP 2020-132939, filed Aug. 5, 2020, the entire contents of each are incorporated herein by reference.

TECHNICAL FIELD

The present disclosure relates to a vacuum interrupter where a fixed-side electrode and a movable-side electrode are disposed in an insulation container made of ceramics or the like, and that disconnects and connects a circuit.

BACKGROUND ART

A vacuum interrupter is a device that connects and disconnects a circuit by closing and opening a pair of fixed-side electrode and movable-side electrode. The electrodes are disposed in an insulation container made of a cylindrical ceramic, and an interior of the insulation container is kept in a vacuum state. When a fault such as a leakage or a short circuit occurs, it is possible to shut off the circuit and prevent a fault current from occurring, by opening the pair of fixed-side electrode and movable-side electrode. At this time, the electrodes generate heat, and an arc is generated by generating metal vapor from contact surfaces and causing a current to flow. The arc diffuses over the entire electrode surfaces, and when metal vapor adheres to the ceramic constituting the insulation container, there is a possibility that dielectric breakdown occurs. Therefore, by disposing a cylindrical metal (arc shield) around the electrodes, adhesion to the ceramic constituting the insulation container is prevented.

Since the arc shield is disposed within the insulation container made of ceramics, the arc shield is electrically floating. In this state, a floating potential of the arc shield decreases on the ground side, and a high electric field intensity is generated in the electrode disposed near the arc shield, so that there is a possibility that dielectric breakdown occurs in vacuum. In order to avoid this, it is necessary to control the floating potential of the arc shield using an external voltage sharing element (capacitor or resistor) and apply an equal electric field to each electrode, but this method has a problem that the vacuum interrupter becomes large in size.

Here, as a method of preventing the size of the vacuum interrupter from increasing, PTL 1 discloses a technique of forming a non-linear resistor such as zinc oxide (ZnO) or silicon carbide (SiC) on an inner surface or an outer surface of an insulation container made of ceramics. A nonlinear resistor has a characteristic that its resistivity rapidly decreases when an electric field greater than or equal to a certain operating electric field is applied. Therefore, it is possible to equalize the floating potential of the arc shield by designing the resistivity of the nonlinear resistance to be lower than impedance within the vacuum interrupter when a high voltage such as a lightning impulse (high frequency) is applied, and an equal electric field may be applied to each electrode, and the dielectric breakdown resistance in vacuum may be improved.

CITATION LIST

Patent Literature

PTL 1: Utility Model Laying-Open No. 60-75940

SUMMARY OF INVENTION

Technical Problem

However, in the vacuum interrupter of PTL 1, when an alternating-current voltage (low frequency) is applied, the electric field applied to the nonlinear resistor is less than the operating electric field. Therefore, there is a problem that the resistivity of the nonlinear resistor exceeds the impedance within the vacuum interrupter, and the floating potential of the arc shield is biased to the ground side, leading to dielectric breakdown.

The present disclosure has been made to solve this problem, and is able to provide a vacuum interrupter capable of achieving both size reduction of the vacuum interrupter and dielectric breakdown resistance, as it is possible to control the floating potential of the arc shield even when either of an AC voltage (low frequency) or a lightning impulse voltage (high frequency) is applied without using an external voltage sharing element such as a capacitor.

Solution to Problem

A vacuum interrupter according to the present disclosure includes: a cylindrical insulation container; a movable-side end plate to close one end portion of the insulation container; a fixed-side end plate to close another end portion of the insulation container; a movable-side electrode provided at a distal end portion of a movable-side electrode rod disposed to penetrate the movable-side end plate; a fixed-side electrode provided at a distal end portion of a fixed-side electrode rod disposed to penetrate the fixed-side end plate so as to face the movable-side electrode; and an arc shield disposed so as to surround the movable-side electrode and the fixed-side electrode, wherein a linear resistive layer and a nonlinear resistive layer are disposed so as to cover at least a part of a periphery of the insulation container, and a magnitude relationship of each resistivity is $R1>R3>R2$, where a resistivity of the nonlinear resistive layer less than an operating electric field is R1, a resistivity less than or equal to an impedance when a lightning impulse is applied is R2, and a resistivity of the linear resistive layer is R3.

Advantageous Effects of Invention

According to the vacuum interrupter of the present disclosure, at least one of a linear resistive layer and a nonlinear resistive layer is disposed so as to cover at least a part of the periphery of the insulation container. Therefore, it is possible to provide a vacuum interrupter capable of achieving both downsizing of the vacuum interrupter and dielectric breakdown resistance at the time of application of either the AC voltage (low frequency) or the lightning impulse voltage (high frequency).

DESCRIPTION OF EMBODIMENTS

First Embodiment

Figure 1:
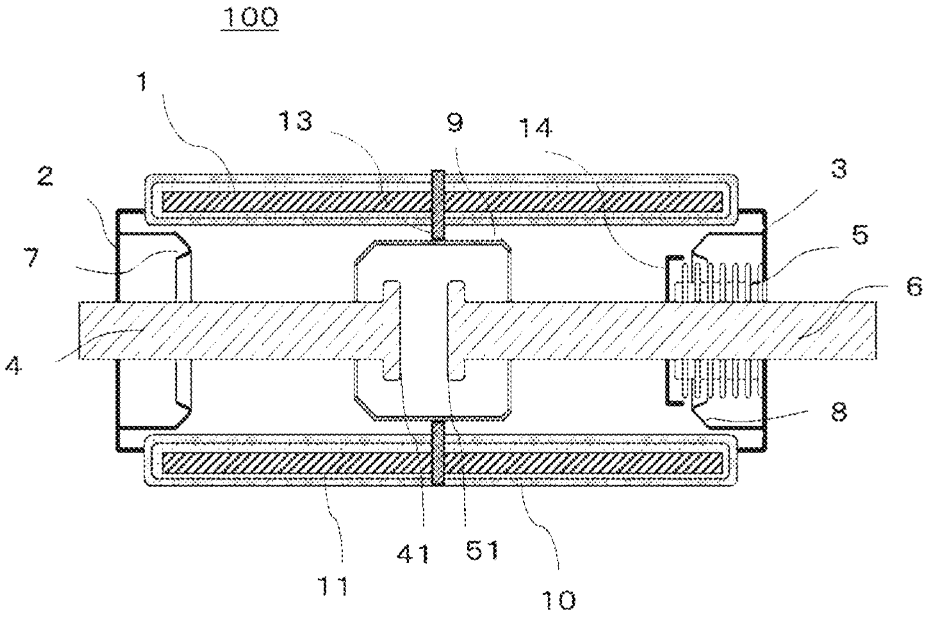
FIG. 1 is a cross-sectional view of a vacuum interrupter 100 according to a first embodiment of the present disclosure.
Figure 2:
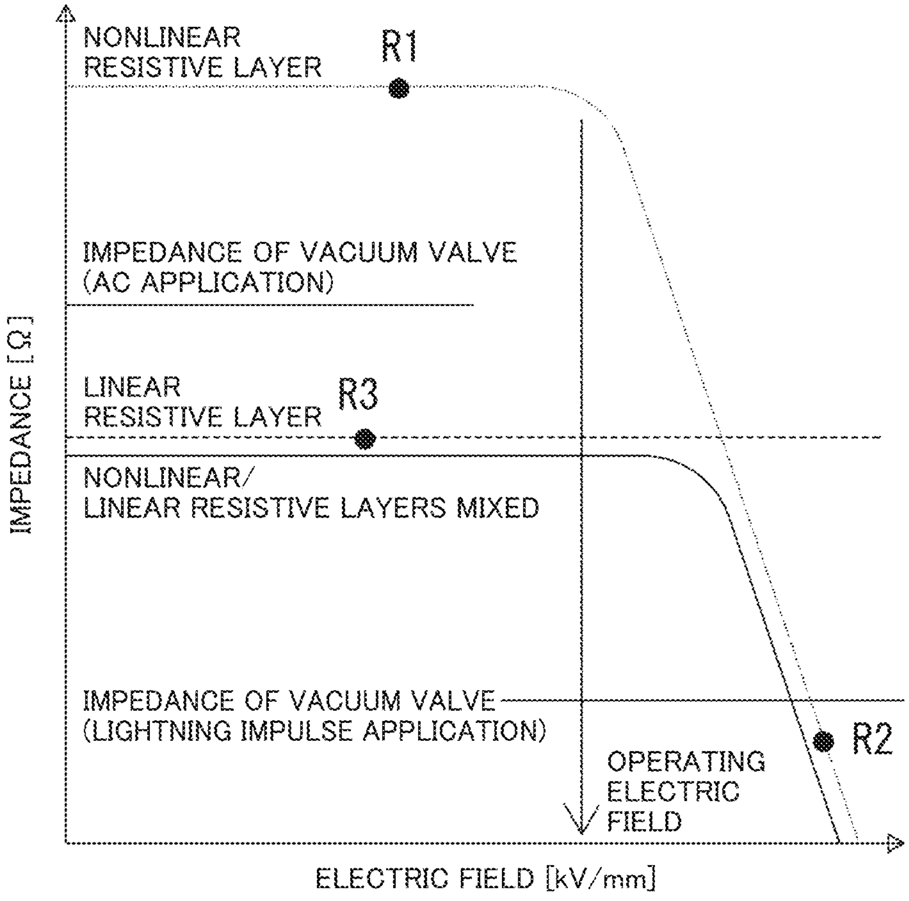
FIG. 2 is a distribution diagram showing a relationship between impedance and an electric field of the vacuum interrupter according to the first embodiment of the present disclosure.

A vacuum interrupter according to a first embodiment of the present disclosure will be described in detail with reference to the drawings. FIG. 1 is a cross-sectional view of a vacuum interrupter 100 according to the first embodiment of the present disclosure, and FIG. 2 is a distribution diagram showing a relationship between impedance and an electric field of the vacuum interrupter according to the first embodiment of the present disclosure.

First, with reference to FIG. 1, a configuration of vacuum interrupter 100 according to the first embodiment will be described. Vacuum interrupter 100 includes a cylindrical insulation container 1, a movable-side end plate 3 to close one end portion of insulation container 1, a fixed-side end plate 2 to close the other end portion of insulation container 1, a movable-side electrode 51 provided at a distal end portion of a movable-side electrode rod disposed to penetrate movable-side end plate 3, a fixed-side electrode 41 provided at a distal end portion of a fixed-side electrode rod disposed to penetrate fixed-side end plate 2 so as to face movable-side electrode 51, and an arc shield 9 disposed so as to surround movable-side electrode 51 and fixed-side electrode 41. Cylindrical insulation container 1 is made of an insulating member such as ceramics. Movable-side end plate 3 is disposed at one end portion of insulation container 1, and the end portion of insulation container 1 is connected to an end portion of movable-side end plate 3. Further, fixed-side end plate 2 is disposed at the other end portion of insulation container 1, and the end portion of insulation container 1 is connected to an end portion of fixed-side end plate 2. Each of fixed-side end plate 2 and movable-side end plate 3 is formed by bending an outer peripheral end portion of a disk. In FIG. 1, insulation container 1 is provided as a single component, but insulation container 1 may be provided by two or more components.

Further, insulation container 1 is arranged such that a linear resistive layer 10 and a nonlinear resistive layer 11 are laminated to cover around the insulation container. In the configuration of the first embodiment, nonlinear resistive layer 11 is disposed so as to be in contact with insulation container 1, and linear resistive layer 10 is laminated on an outer periphery of the nonlinear resistive layer. However, linear resistive layer 10 may be disposed so as to be in contact with insulation container 1, and nonlinear resistive layer 11 may be laminated on an outer periphery of the linear resistive layer. Arc shield 9 supported by a support portion 13 of insulation container 1 is provided inside insulation container 1. Support portion 13 is in contact with both linear resistive layer 10 and nonlinear resistive layer 11 outside insulation container 1. In addition, two insulation containers 1 may be used with support portion 13 as a boundary. Arc shield 9 is formed of a conductive member such as metal, and is provided so as to cover movable-side electrode 51 and fixed-side electrode 41 described later.

Movable-side end plate 3 is attached to one end of a bellows 5 that is extensible leftward and rightward on a paper surface, and the other end of bellows 5 is attached to a bellows shield 14. Further, a movable-side electrode rod 6 is attached so as to penetrate bellows shield 14 and movable-side end plate 3. Further, movable-side electrode 51 is provided at an end portion of movable-side electrode rod 6 covered by arc shield 9. Further, to movable-side end plate 3, a movable-side shield 8 is attached between the end portion of movable-side end plate 3 and movable-side electrode rod 6 so as to surround movable-side electrode rod 6. Note that movable-side end plate 3, bellows 5, bellows shield 14, movable-side electrode rod 6, movable-side electrode 51, and movable-side shield 8 are electrically connected.

Movable-side shield 8 exhibits an effect of relaxing an electric field intensity generated at the end portion of movable-side end plate 3. In a case where movable-side shield 8 is not provided in movable-side end plate 3, when a voltage is applied to movable-side electrode rod 6, a high electric field intensity is locally generated at the end portion of movable-side end plate 3, and there is a possibility that dielectric breakdown occurs. From this viewpoint, it is desirable that movable-side end plate 3 is in contact with insulation container 1 via linear resistive layer 10 and non-linear resistive layer 11.

Fixed-side electrode rod 4 is attached to fixed-side end plate 2 so as to penetrate fixed-side end plate 2. Further, fixed-side electrode 41 is provided at an end portion of fixed-side electrode rod 4 covered by arc shield 9. Further, to fixed-side end plate 2, a fixed-side shield 7 is attached between the end portion of fixed-side end plate 2 and fixed-side end plate 2 so as to surround fixed-side electrode rod 4. Fixed-side end plate 2, fixed-side electrode rod 4, fixed-side electrode 41, and fixed-side shield 7 are electrically connected.

Fixed-side shield 7 exhibits an effect of relaxing an electric field intensity generated at the end portion of fixed-side end plate 2. In a case where fixed-side shield 7 is not provided in fixed-side end plate 2, when a voltage is applied to fixed-side electrode rod 4, a high electric field intensity is locally generated at the end portion of fixed-side end plate 2, and there is a possibility that dielectric breakdown occurs. From this viewpoint, it is desirable that fixed-side end plate 2 is in contact with insulation container 1 via linear resistive layer 10 and nonlinear resistive layer 11.

In addition, arc shield 9 is installed in order to protect other portions from metal vapor and metal particles scattered from movable-side electrode 51 and fixed-side electrode 41 due to heat of an arc when the arc is generated between movable-side electrode 51 and fixed-side electrode 41.

Linear resistive layer 10 and nonlinear resistive layer 11 are laminated and disposed so as to cover the periphery of insulation container 1. Linear resistive layer refers to a layer showing a constant resistivity to an electric field. A specific constituent material of linear resistive layer 10 is a metal containing at least one of Cu, Ag, Cr, Ni, Mo, W, V, Nb, and Ta, and the linear resistive layer can be formed by a vapor deposition method or a sputtering method. In addition, a metal compound or an alloy represented by an oxide may be used as the material. Nonlinear resistive layer 11 refers to a layer having a property that the resistivity decreases when a high electric field greater than or equal to a certain operating electric field is applied. Specific examples of a constituent material of nonlinear resistive layer 11 include zinc oxide (ZnO) and silicon carbide (SiC), and the nonlinear resistive layer can be formed by a vapor deposition method or a sputtering method.

Next, an operation of vacuum interrupter 100 will be described. An interior of vacuum interrupter 100 is kept in a vacuum state of less than $1\times10^{-3}$ Pascal to maintain a high insulation state. In addition, it is possible to switch between a closed state in which movable-side electrode 51 and fixed-side electrode 41 are connected and an open state in which movable-side electrode 51 and fixed-side electrode 41 are disconnected. FIG. 1 shows the open state in which movable-side electrode 51 and fixed-side electrode 41 are not connected. When pressing is applied from the outside to movable-side electrode rod 6 from the right to the left in the drawing, movable-side electrode rod 6 moves to provide the closed state in which movable-side electrode 51 and fixed-side electrode 41 are connected to each other. That is, by moving movable-side electrode rod 6, it is possible to switch the state from the open state to the closed state or from the closed state to the open state.

Next, a dielectric breakdown phenomenon will be described. In the open state, when a voltage is applied between movable-side electrode rod 6 and the fixed-side electrode rod 4, the electric field intensity of a surface of movable-side shield 8 and a surface of fixed-side shield 7 increases, and primary electrons are emitted from the surface of movable-side shield 8 and the surface of fixed-side shield 7 toward the interior of vacuum interrupter 100. When the primary electrons collide with an inner surface of insulation container 1, secondary electrons are emitted from the inner surface of insulation container 1. Due to the emission of the secondary electrons, the inner surface of insulation container 1 is positively charged. If secondary electrons continue to be emitted and charging of the inner surface with positive polarity proceeds, an insulation state between movable-side electrode rod 6 and fixed-side electrode rod 4 may not be maintained. That is, a dielectric breakdown phenomenon may occur. An amount of the emission of the secondary electrons depends on kinetic energy of the primary electrons. That is, depending on the electric field intensity on the inner surface of insulation container 1, the amount of the emission of the secondary electrons increases as the electric field intensity increases. In other words, when the electric field intensity on the inner surface of insulation container 1 is high, there is a high possibility that the dielectric breakdown phenomenon occurs.

In particular, a place where a high electric field intensity is generated in the vacuum interrupter is a contact point between fixed-side electrode 41 and movable-side electrode 51 and a contact point between fixed-side electrode rod 4 and movable-side electrode rod 6 of arc shield 9. This is because arc shield 9 is disposed within the insulation container made of ceramics, and is in an electrically floating state, and in this state, the floating potential of the arc shield decreases on the ground side, and high electric field intensity is generated in the electrode disposed near the arc shield.

The dielectric breakdown resistance required for the vacuum interrupter is mainly required when an alternating-current (50 Hz and 60 Hz in Japan) voltage (low frequency) and a lightning impulse (1.2 us immediately after application) voltage (high frequency) are applied. The impedance representing the resistance in the vacuum interrupter is expressed by an equation below. Here, Z represents impedance, R represents resistivity, f represents frequency, and C represents a capacitive component.

$$Z = \sqrt{R^2 + \left(\frac{1}{2\pi fC}\right)^2}$$ [Mathematical formula 1]

An alternating current whose frequency f is low has a characteristic that the impedance increases, and a lightning impulse whose frequency f is high has a characteristic that the capacitive component C becomes dominant and the impedance decreases. When a capacitor as an external voltage sharing element is connected in parallel, the impedance of the capacitor exhibits frequency dependence, so that the floating potential of arc shield 9 can be controlled in both frequency regions of alternating current and lightning impulses. However, in this case, there arises a problem that a size of the vacuum interrupter itself increases and periodic maintenance work is required.

In a case where linear resistive layer 10 and nonlinear resistive layer 11 are disposed so as to cover at least a part of the periphery of insulation container 1, the floating potential of arc shield 9 can be controlled, and the dielectric breakdown resistance can be maintained even at the time of application of either the AC voltage (low frequency) or the lightning impulse voltage (high frequency). FIG. 2 is a distribution diagram showing the relationship between the impedance of the vacuum interrupter and the electric field when at least one of linear resistive layer 10 and nonlinear resistive layer 11 is disposed so as to cover at least a part of the periphery of insulation container 1 with linear resistive layer 10 and nonlinear resistive layer 11 according to the first embodiment of the present disclosure. Linear resistive layer 10 exhibits constant resistivity R3 with respect to the electric field, whereas non-linear resistive layer 11 exhibits a characteristic of rapidly decreasing from the resistivity R1 to the resistivity R2 when a high electric field greater than or equal to a certain operating electric field is applied. As illustrated in FIG. 2, a magnitude relationship of the resistivity is R1>R3>R2, where the resistivity of nonlinear resistive layer 11 less than the operating electric field is R1, the resistivity less than or equal to the impedance at the time of application of the lightning impulse is R2, and the resistivity of linear resistive layer 10 is R3.

In a case where only linear resistive layer 10 is provided around insulation container 1, the floating potential of arc shield 9 can be controlled by designing such that the resistivity of linear resistive layer 10 falls below the impedance of the vacuum interrupter when an AC voltage whose frequency f is low is applied. However, when a lightning impulse voltage whose frequency f is high is applied, the resistivity of linear resistive layer 10 exceeds the impedance of the vacuum interrupter, so that the floating potential of arc shield 9 cannot be controlled. In addition, in a case where only nonlinear resistive layer 11 is provided, the resistivity of nonlinear resistive layer 11 exceeds the impedance of the vacuum interrupter when an alternating-current voltage whose frequency f is low is applied, so that the floating potential of arc shield 9 cannot be controlled. On the other hand, when a lightning impulse voltage whose frequency f is high is applied, the floating potential of arc shield 9 can be controlled by designing the resistivity of nonlinear resistive layer 11 falls below the impedance of the vacuum interrupter.

In a case where linear resistive layer 10 and nonlinear resistive layer 11 are disposed so as to cover at least a part of the periphery of insulation container 1, the floating potential of arc shield 9 can be controlled by resistance voltage division of the resistivity R3 of linear resistive layer 10 for the AC voltage (low frequency) and the resistivity R3 of nonlinear resistive layer 11 for the lightning impulse voltage (high frequency), and thus, it is possible to provide a vacuum interrupter with which the dielectric breakdown resistance can be maintained even at the time of application of either the AC voltage (low frequency) or the lightning impulse voltage (high frequency).

In vacuum interrupter 100 according to the first embodiment of the present disclosure, linear resistive layer 10 and nonlinear resistive layer 11 are laminated and cover the periphery of insulation container 1, and the magnitude relationship of each resistivity is R1>R3>R2, where the resistivity of nonlinear resistive layer less than an operating electric field is R1, the resistivity less than or equal to an impedance at the time of application of a lightning impulse is R2, and the resistivity of the linear resistive layer is R3. As a result, it is possible to provide a vacuum interrupter that can achieve both downsizing of the vacuum interrupter and the dielectric breakdown resistance even at the time of application of either the AC voltage (low frequency) or the lightning impulse voltage (high frequency).

Second Embodiment

Figure 3:
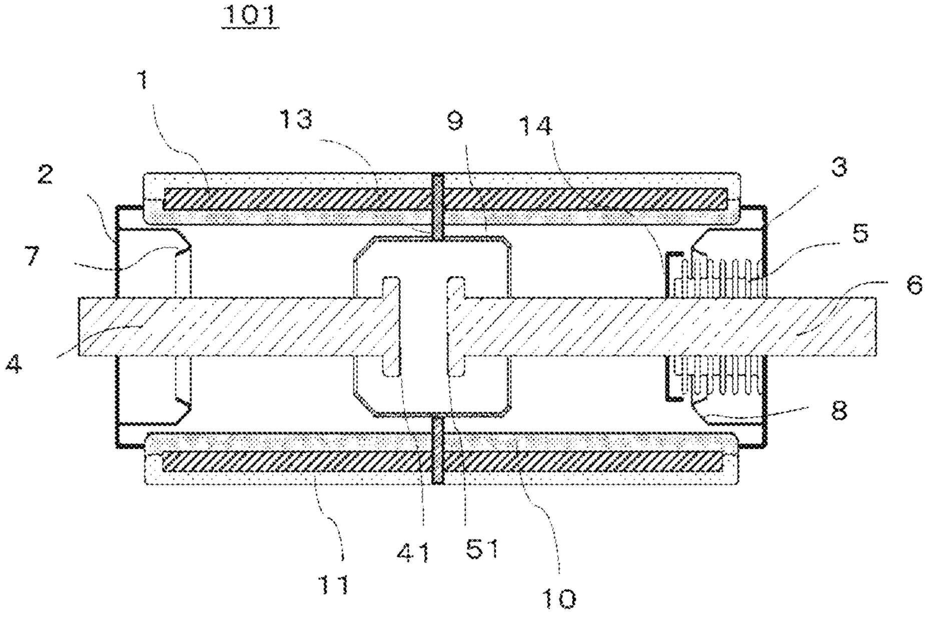
FIG. 3 is a cross-sectional view of a vacuum interrupter 101 according to a second embodiment of the present disclosure.

In the first embodiment, a mode has been described in which the linear resistive layer and the nonlinear resistive layer are laminated and arranged so as to cover the periphery of the insulation container. In a second embodiment, a mode in which linear resistive layer 10 is disposed on the inner surface of the insulation container and nonlinear resistive layer 11 is disposed on the outer surface of the insulation container so as to cover the periphery of the insulation container will be described. With reference to FIG. 3, a configuration of a vacuum interrupter 101 according to the second embodiment will be described. In FIG. 3, the same reference numerals or the same reference numerals as those in FIG. 1 denote the same or equivalent components as the components illustrated in the first embodiment, and thus a detailed description thereof will be omitted.

As illustrated in FIG. 3, in the vacuum interrupter according to the second embodiment, linear resistive layer 10 is disposed on the inner surface of the insulation container, and nonlinear resistive layer 11 is disposed on the outer surface of the insulation container so as to cover the periphery of the insulation container. The vacuum interrupter needs to be heated at a high temperature in a vacuum furnace in the manufacturing process in order to keep the interior of the vacuum interrupter in the vacuum state. In the vacuum interrupter according to the present embodiment, linear resistive layer 10 is disposed on the inner surface of the insulation container, and nonlinear resistive layer 11 is disposed on the outer surface of the insulation container. The magnitude relationship of each resistivity is R1>R3>R2, where the resistivity of nonlinear resistive layer less than the operating electric field is denoted by R1, the resistivity greater than or equal to the operating electric field is denoted by R2, and the resistivity of the linear resistive layer is denoted by R3. As a result, it is possible to provide a vacuum interrupter that can achieve both downsizing of the vacuum interrupter and the dielectric breakdown resistance even at the time of application of either the AC voltage (low frequency) or the lightning impulse voltage (high frequency), without impairing nonlinearity of resistivity during high temperature heating.

Third Embodiment

Figure 4:
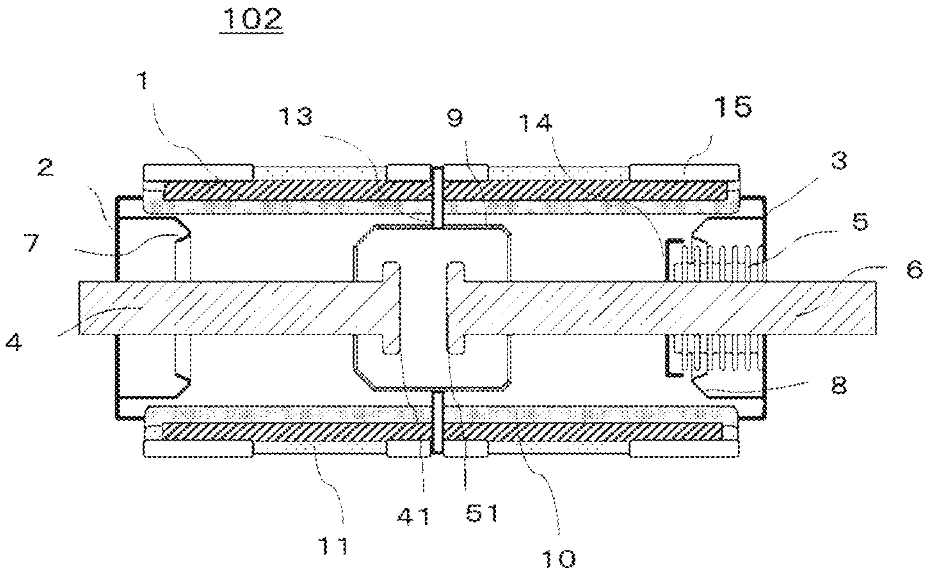
FIG. 4 is a cross-sectional view of a vacuum interrupter 102 according to a third embodiment of the present disclosure.

In the second embodiment, linear resistive layer 10 is disposed on the inner surface of the insulation container, and nonlinear resistive layer 11 is disposed on the outer surface of the insulation container so as to cover the periphery of the insulation container. In the present the third embodiment, a mode will be described in which linear resistive layer 10 is disposed on the inner surface of the insulation container, and nonlinear resistive layer 11 and a metal layer 15 are disposed on the outer surface of the insulation container so as to cover the periphery of the insulation container. With reference to FIG. 4, a configuration of a vacuum interrupter 102 according to the third embodiment will be described. In FIG. 3, the same reference numerals or the same reference numerals as those in FIG. 1 denote the same or equivalent components as the components illustrated in the first embodiment, and thus a detailed description thereof will be omitted.

As illustrated in FIG. 4, in the vacuum interrupter according to the third embodiment, linear resistive layer 10 is disposed on the inner surface of the insulation container, and nonlinear resistive layer 11 is disposed on the outer surface of the insulation container so as to cover the periphery of the insulation container. Metal layer 15 made of a conductive metal is provided in a portion facing fixed-side shield 7, movable-side shield 8, and arc shield 9 outside the insulation container. In addition, the magnitude relationship of each resistivity is R1>R3>R2, where the resistivity of the nonlinear resistive layer less than the operating electric field is R1, the resistivity less than or equal to the impedance at the time of application of the lightning impulse is R2, and the resistivity of the linear resistive layer is R3. As a result, it is possible to achieve both downsizing of the vacuum interrupter and dielectric breakdown resistance even at the time of application of either the AC voltage (low frequency) or the lightning impulse voltage (high frequency) is applied, and it is possible to prevent through breakdown as the equipotential surface enters in the direction perpendicular to the creeping direction of insulation container 1, and a potential difference between the inner surface and the outer surface of insulation container 1 decreases.

Fourth Embodiment

Figure 5:
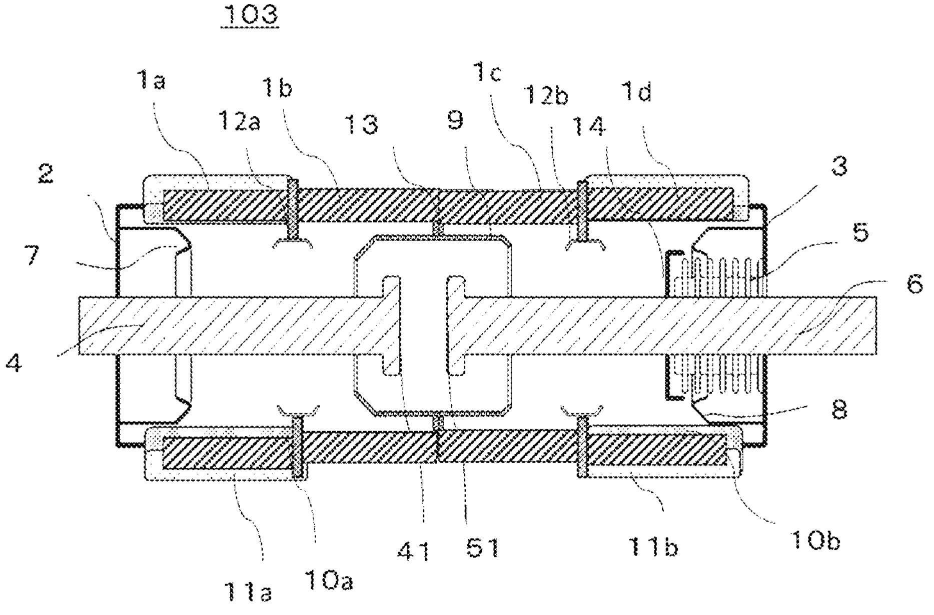
FIG. 5 is a cross-sectional view of a vacuum interrupter 103 according to a fourth embodiment of the present disclosure.

In the first embodiment and the second embodiment, a mode in which insulation container 1 is provided as a single component has been described. In a fourth embodiment, a mode in which insulation container 1 is configured by a plurality of components will be described. With reference to FIG. 5, a configuration of a vacuum interrupter 103 according to the fourth embodiment will be described. In FIG. 5, the same reference numerals or the same reference numerals as those in FIG. 1 denote the same or equivalent components as the components illustrated in the first embodiment and the second embodiment, and thus a detailed description thereof will be omitted.

A first fixed-electrode-side insulating member 1*a*, a second fixed-electrode-side insulating member 1*b*, a first movable-electrode-side insulating member 1*c*, and a second movable-electrode-side insulating member 1*d* are made of insulating members such as ceramics. First fixed-electrode-side insulating member 1*a* and second fixed-electrode-side insulating member 1*b* are sealed with a sealing member, and the sealing member is connected to a connector of a first floating shield 12*a* and holds first floating shield 12*a*. Further, first movable-electrode-side insulating member 1*c* and second movable-electrode-side insulating member 1*d* are sealed with a sealing member, and the sealing member is connected to a connector of a second floating shield 12*b* and holds second floating shield 12*b*. Further, second fixed-electrode-side insulating member 1*b* and first movable-electrode-side insulating member 1*c* are sealed with a sealing member, and the sealing member is connected to support portion 13 and holds arc shield 9. That is, in the first to the third embodiment, insulation container 1 is provided as a single component, but in the fourth embodiment, insulation container 1 is provided by first fixed-electrode-side insulating member 1*a*, second fixed-electrode-side insulating member 1*b*, first movable-electrode-side insulating member 1*c*, and second movable-electrode-side insulating member 1*d*. The sealing members seal between first fixed-electrode-side insulating member 1*a* and second fixed-electrode-side insulating member 1*b*, between first movable-electrode-side insulating member 1*c* and second movable-electrode-side insulating member 1*d*, between second fixed-electrode-side insulating member 1*b* and first movable-electrode-side insulating member 1*c*, and hold first floating shield 12*a*, second floating shield 12*b*, and arc shield 9. The support portions of first floating shield 12*a* and second floating shield 12*b* are in contact with both linear resistive layer 10 and nonlinear resistive layer 11 outside insulation container 1.

Further, linear resistive layer 10 is disposed on the inner surface and non-linear resistive layer 11 is disposed on the outer surface so as to cover the periphery of the insulation container of first fixed-electrode-side insulating member 1*a* disposed on a fixed-side end plate 2 side and second movable-electrode-side insulating member 1*d* disposed on a movable-side end plate 3 side. In addition, the magnitude relationship of each resistivity is R1>R3>R2, where the resistivity of the nonlinear resistive layer less than the operating electric field is R1, the resistivity less than or equal to the impedance at the time of application of the lightning impulse is R2, and the resistivity of the linear resistive layer is R3. As a result, while the floating potential of arc shield 9 at the center of the vacuum interrupter is controlled in the first to the third embodiment, the floating potentials of first floating shield 12*a* and second floating shield 12*b* are controlled in the fourth embodiment. In the vacuum interrupter of the fourth embodiment, since linear resistive layer 10 is disposed on the inner surface and nonlinear resistive layer 11 is disposed on the outer surface so as to cover the periphery of the insulation container of first fixed-electrode-side insulating member 1*a* disposed on the fixed-side end plate 2 side and second movable-electrode-side insulating member 1*d* disposed on the movable-side end plate 3 side, it is possible to achieve both downsizing of the vacuum interrupter and dielectric breakdown resistance even at the time of application of either the AC voltage (low frequency) or the lightning impulse voltage (high frequency) is applied, and it is possible to prevent the leakage current as an energization path in which the current turns back at the first floating shield 12*a* and the second floating shield 12*b* is provided. Further, even when a lightning impulse voltage is applied, electrification can be prevented by conducting the voltage to fixed-side end plate 2 and movable-side end plate 3. Furthermore, an effect of enabling application of a high voltage to the electrode is obtained.

Fifth Embodiment

Next, a configuration of a vacuum interrupter 104 according to the fifth embodiment will be described with reference to FIG. 6. Unless otherwise specified, the fifth embodiment has the same configuration and effects as those of the third embodiment described above. Therefore, the same components as those in the third embodiment are denoted by the same reference numerals, and a description thereof will not be repeated.

Figure 6:
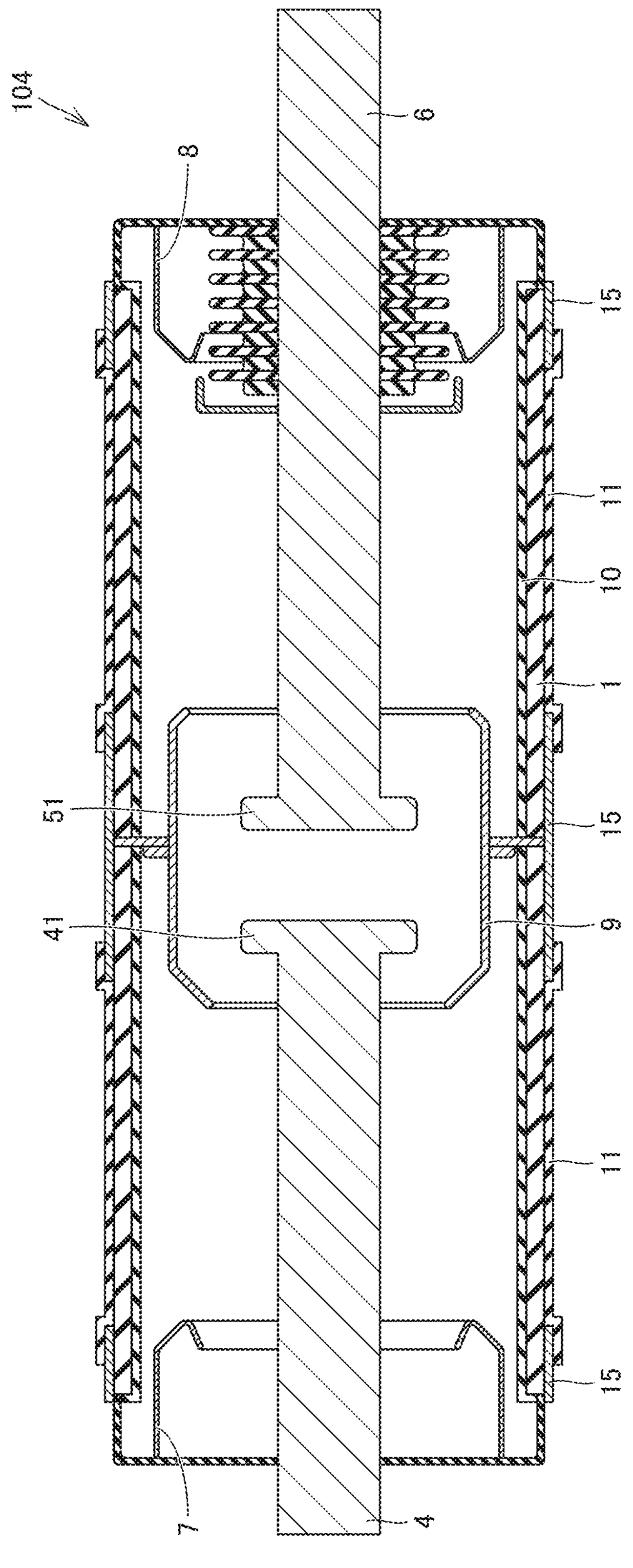
FIG. 6 is a cross-sectional view of a vacuum interrupter 104 according to a fifth embodiment of the present disclosure.

As illustrated in FIG. 6, in the present embodiment, linear resistive layer 10 is disposed on the inner surface of insulation container 1. Nonlinear resistive layer 11 is disposed on the outer surface of insulation container 1 so as to cover the periphery of insulation container 1. Metal layer 15 is disposed on the outer surface of insulation container 1 so as to cover the periphery of insulation container 1.

Metal layer 15 is disposed so as to face each of fixed-side shield 7, movable-side shield 8, and arc shield 9 disposed inside insulation container 1. Metal layer 15 is made of a conductive metal. In the present embodiment, nonlinear resistive layer 11 is overlapped on an end portion of metal layer 15. Nonlinear resistive layer 11 covers the end portion of metal layer 15. The end portion of metal layer 15 is sandwiched between nonlinear resistive layer 11 and the outer surface of insulation container 1. Although not illustrated, the end portion of metal layer 15 may cover nonlinear resistive layer 11.

Next, effects of the present embodiment will be described.

According to vacuum interrupter 104 of the present embodiment, as illustrated in FIG. 6, nonlinear resistive layer 11 is overlapped on metal layer 15. Therefore, a contact area between nonlinear resistive layer 11 and metal layer 15 can be increased. Nonlinear resistive layer 11 and metal layer 15 can be brought into surface contact with each other. Therefore, the contact resistance between nonlinear resistive layer 11 and metal layer 15 can be improved (reduced). This can improve conduction to non-linear resistive layer 11 when a lightning impulse is applied. Therefore, the floating potential of arc shield 9 can be controlled.

Metal layer 15 is disposed so as to face fixed-side shield 7, movable-side shield 8, and arc shield 9. Therefore, equipotential surfaces can be provided along each of directions from metal layer 15 toward fixed-side shield 7, from metal layer 15 toward movable-side shield 8, and from metal layer 15 toward arc shield 9. That is, the equipotential surfaces can be provided so as to intersect with a creeping direction of insulation container 1 covered with metal layer 15. Therefore, the potential difference between the inner surface and the outer surface of insulation container 1 can be reduced. Therefore, through breakdown (dielectric breakdown) can be prevented.

When the resistivity of nonlinear resistive layer 11 less than the operating electric field is R1, the resistivity less than or equal to the impedance at the time of application of the lightning impulse is R2, and the resistivity of linear resistive layer 10 is R3, R1, R3, and R2 are larger in this order. This makes it possible to achieve size reduction of vacuum interrupter 104 and to achieve dielectric breakdown resistance under each of the conditions of application of an AC voltage (low frequency) and application of a lightning impulse (high frequency).

Sixth Embodiment

Next, a configuration of a vacuum interrupter 105 according to a sixth embodiment will be described with reference to FIGS. 7 and 8. Unless otherwise specified, the sixth embodiment has the same configuration and effects as those of the third embodiment described above. Therefore, the same components as those in the third embodiment are denoted by the same reference numerals, and a description thereof will not be repeated.

Figure 7:
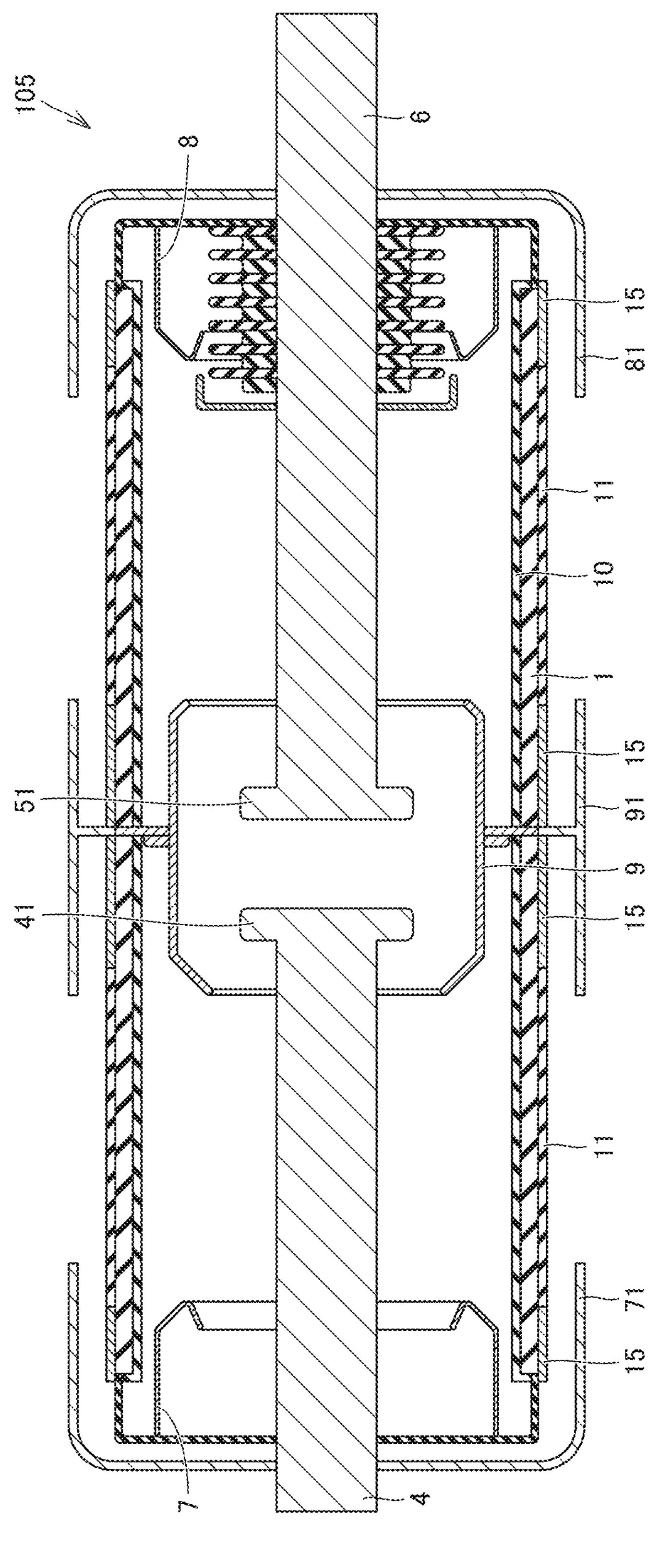
FIG. 7 is a cross-sectional view of a vacuum interrupter 105 according to a sixth embodiment of the present disclosure.

As illustrated in FIG. 7, vacuum interrupter 105 according to the present embodiment further includes a fixed-side field relaxation ring 71, a movable-side field relaxation ring 81, and an intermediate field relaxation ring 91. Each of fixed-side field relaxation ring 71, movable-side field relaxation ring 81, and intermediate field relaxation ring 91 is configured by an annular member made of metal. Each of fixed-side field relaxation ring 71, movable-side field relaxation ring 81, and intermediate field relaxation ring 91 is disposed outside insulation container 1.

Fixed-side field relaxation ring 71 surrounds the other end portion of insulation container 1. Fixed-side field relaxation ring 71 surrounds the other end portion of insulation container 1 outside insulation container 1. Fixed-side field relaxation ring 71 sandwiches insulation container 1 with fixed-side shield 7. The electric field emphasized by an end portion of fixed-side shield 7 inside insulation container 1 can be relaxed by fixed-side field relaxation ring 71.

Movable-side field relaxation ring 81 surrounds one end portion of insulation container 1. Movable-side field relaxation ring 81 surrounds one end portion of insulation container 1 outside insulation container 1. Movable-side field relaxation ring 81 sandwiches insulation container 1 with movable-side shield 8. The electric field emphasized by an end portion of movable-side shield 8 inside insulation container 1 can be relaxed by movable-side field relaxation ring 81.

Intermediate field relaxation ring 91 sandwiches insulation container 1 with arc shield 9. The electric field emphasized at the triple point between arc shield 9 and insulation container 1 can be relaxed by intermediate field relaxation ring 91.

Metal layer 15 is disposed so as to face each of fixed-side field relaxation ring 71, movable-side field relaxation ring 81, and intermediate field relaxation ring 91. Metal layer 15 is disposed between fixed-side field relaxation ring 71 and insulation container 1. Metal layer 15 is disposed between movable-side field relaxation ring 81 and insulation container 1. Metal layer 15 is disposed between intermediate field relaxation ring 91 and insulation container 1.

Next, effects of the present embodiment will be described.

According to vacuum interrupter 105 of the present embodiment, as illustrated in FIG. 7, metal layer 15 is disposed so as to face each of fixed-side field relaxation ring 71, movable-side field relaxation ring 81, and intermediate field relaxation ring 91. Therefore, the potential of metal layer 15 can be made the same as the potential of fixed-side field relaxation ring 71, the potential of movable-side field relaxation ring 81, and the potential of intermediate field relaxation ring 91. Therefore, an increase in the potential of metal layer 15 can be suppressed. Therefore, it is possible to suppress the occurrence of dielectric breakdown between metal layer 15 and fixed-side field relaxation ring 71, between metal layer 15 and movable-side field relaxation ring 81, and between metal layer 15 and intermediate field relaxation ring 91.

If metal layer 15 is not provided, the distribution of the creeping electric field is biased in nonlinear resistive layer 11. FIG. 8 illustrates an example of the distribution of the creeping electric field of insulation container 1 at the time (1.2 μs) when the voltage value of the lightning impulse is the highest. A solid line in FIG. 8 indicates the distribution of the creeping electric field in a case where metal layer 15 is provided. A broken line in FIG. 8 indicates the distribution of the creeping electric field in a case where metal layer 15 is not provided. An alternate long and short dash line in FIG. 8 indicates an operating electric field of nonlinear resistive layer 11. A horizontal axis in FIG. 8 indicates the position of the surface of insulation container 1 in the direction from intermediate field relaxation ring 91 toward movable-side field relaxation ring 81. A left end of the horizontal axis in FIG. 8 is a position of an intersection between linear resistive layer 10 and intermediate field relaxation ring 91 on the surface of insulation container 1. A right end of the horizontal axis in FIG. 8 is a position of the end portion of linear resistive layer 10 on a movable-side field relaxation ring 81 side on the surface of insulation container 1.

Figure 8:
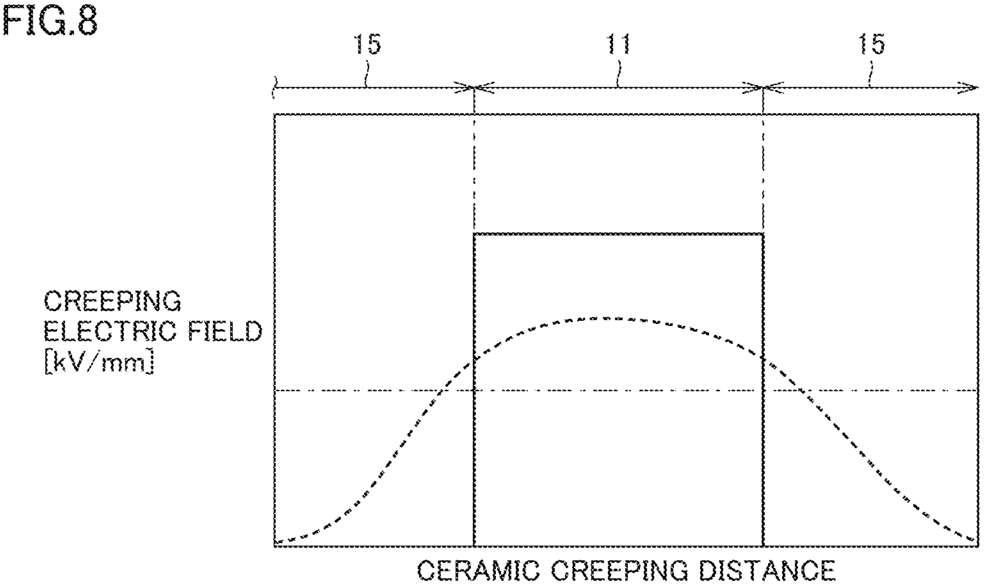
FIG. 8 is a graph showing a relationship between a creeping electric field and a ceramic creeping distance in the sixth embodiment of the present disclosure.

As illustrated in FIG. 8, if metal layer 15 is not provided, the creeping electric field at the position of the intersection between linear resistive layer 10 and intermediate field relaxation ring 91 on the surface of insulation container 1 (left end of the horizontal axis) is smaller than the operating electric field of nonlinear resistive layer 11. Further, if metal layer 15 is not provided, the creeping electric field at the position of the end portion of the surface of insulation container 1 on the movable-side field relaxation ring 81 side (right end of the horizontal axis) is smaller than the operating electric field of nonlinear resistive layer 11. Therefore, when metal layer 15 is not provided, the resistivity at these two positions are R1. Moreover, if metal layer is not provided, the creeping electric field at the position on a nonlinear resistive layer 11 side of the surface of insulation container 1 may be larger than the operating electric field of nonlinear resistive layer 11. Therefore, when metal layer 15 is not provided, the resistivity at the position on the nonlinear resistive layer 11 side of the surface of insulation container 1 may be R2. Therefore, the distribution of the resistivity on the surface of insulation container 1 may be biased. The bias in the distribution of the resistivity on the surface of insulation container 1 is caused by the bias in the equipotential surface entering the surface of insulation container 1 due to fixed-side shield 7, movable-side shield 8, arc shield 9, fixed-side field relaxation ring 71, movable-side field relaxation ring 81, and intermediate field relaxation ring 91. For this reason, there is a possibility that conduction of nonlinear resistive layer 11 is not secured at the time (1.2 μs) when the voltage value of the lightning impulse is the highest. Therefore, it is difficult to control the floating potential of arc shield 9.

On the other hand, according to vacuum interrupter 105 of the present embodiment, as illustrated in FIG. 7, metal layer 15 is disposed so as to face each of fixed-side field relaxation ring 71, movable-side field relaxation ring 81, and intermediate field relaxation ring 91. Therefore, the potential of metal layer 15 can make the potential of fixed-side field relaxation ring 71, the potential of movable-side field relaxation ring 81, and the potential of intermediate field relaxation ring 91 the same. Therefore, the creeping electric field is not generated in metal layer 15, and is uniformly generated only in nonlinear resistive layer 11. Therefore, an overall resistivity of nonlinear resistive layer 11 can be set to R2 at the time (1.2 μs) when the voltage value of the lightning impulse is the highest. In other words, the entire resistivity of nonlinear resistive layer 11 can be made uniform at the time (1.2 μs) when the voltage value of the lightning impulse is the highest. As a result, the floating potential of arc shield 9 can be easily controlled without time delay.

In each of the above embodiments, the resistivity R2 less than or equal to the impedance when the lightning impulse is applied is desirably smaller than $10^9$ Ωm.

The embodiments disclosed herein should be considered to be illustrative in all respects and not restrictive. The scope of the present invention is defined by the claims, instead of the descriptions stated above, and it is intended that meanings equivalent to the claims and all modifications within the scope are included.

REFERENCE SIGNS LIST

1: insulation container, 1*a*: first fixed-electrode-side insulating member, 1*b*: second fixed-electrode-side insulating member, 1*c*: first movable-electrode-side insulating member, 1*d*: second movable-electrode-side insulating member, 2: fixed-side end plate, 3: movable-side end plate, 4: fixed-side electrode rod, 5: bellows, 6: movable-side electrode rod, 7: fixed-side shield, 8: movable-side shield, 9: arc shield, 10: linear resistive layer, 11: nonlinear resistive layer, 12*a*: first floating shield, 12*b*: second floating shield, 13: support portion, 14: bellows shield, 15: metal layer, 41: fixed-side electrode, 51: movable-side electrode, 100, 101, 102, 103: vacuum interrupter

The invention claimed is:

1. A vacuum interrupter comprising:
a cylindrical insulation container;
a movable-side end plate to close one end portion of the insulation container;
a fixed-side end plate to close another end portion of the insulation container;
a movable-side electrode provided at a distal end portion of a movable-side electrode rod disposed to penetrate the movable-side end plate;
a fixed-side electrode provided at a distal end portion of a fixed-side electrode rod disposed to penetrate the fixed-side end plate so as to face the movable-side electrode; and
an arc shield disposed so as to surround the movable-side electrode and the fixed-side electrode,
wherein a linear resistive layer and a nonlinear resistive layer are disposed so as to cover at least a part of a periphery of the insulation container, and
a magnitude relationship of each resistivity is R1>R3>R2, where R1 is a resistivity of the nonlinear resistive layer when an applied electric field is less than an operating electric field R2 is a resistivity of the nonlinear resistive layer when a lightning impulse is applied R2 is less than an impedance of a vacuum valve when the lightning impulse is applied, and R3 is a resistivity of the linear resistive layer.

2. The vacuum interrupter according to claim 1, wherein the linear resistive layer and the nonlinear resistive layer are laminated and disposed around the insulation container.

3. The vacuum interrupter according to claim 1, wherein the linear resistive layer is disposed on an inner surface of the insulation container, and the nonlinear resistive layer is disposed on an outer surface of the insulation container.

4. The vacuum interrupter according to claim 3, wherein a metal layer is further formed on the outer surface of the insulation container.

5. The vacuum interrupter according to claim 4, wherein the nonlinear resistive layer is placed over an end portion of the metal layer.

6. The vacuum interrupter according to claim 4,
wherein the linear resistive layer and the nonlinear resistive layer are laminated and disposed around the insulation container, and
the vacuum interrupter further comprising:
a fixed-side field relaxation ring;
a movable-side field relaxation ring; and
an intermediate field relaxation ring,
wherein the fixed-side field relaxation ring surrounds the other end portion of the insulation container,
the movable-side field relaxation ring surrounds the one end portion of the insulation container,
the intermediate field relaxation ring sandwiches the insulation container with the arc shield, and
the metal layer is disposed so as to face each of the fixed-side field relaxation ring, the movable-side field relaxation ring, and the intermediate field relaxation ring.

7. The vacuum interrupter according to claim 1, wherein
the insulation container includes a first fixed-electrode-side insulating member, a second fixed-electrode-side insulating member, a first movable-electrode-side insulating member, and a second movable-electrode-side insulating member, and
the linear resistive layer is disposed on an inner surface of the insulation container and the nonlinear resistive layer is disposed on an outer surface of the insulation container, such that the linear resistive layer and the nonlinear resistive layer cover around the first fixed-electrode-side insulating member disposed on the fixed-side end plate-side and the second movable-electrode-side insulating member disposed on the movable-side end plate-side.

8. The vacuum interrupter according to claim 1, wherein the linear resistive layer is a metal or a metal compound containing at least one of Cu, Ag, Cr, Ni, Mo, W, V, Nb, and Ta.

9. The vacuum interrupter according to claim 1, wherein the nonlinear resistive layer is any one of zinc oxide and silicon carbide.

10. The vacuum interrupter according to claim 1, wherein the resistivity R2 is smaller than $10^9$ Ωm.

11. A vacuum interrupter comprising:
a movable-side electrode disposed in an insulation container;
a fixed-side electrode disposed in the insulation container so as to face the movable-side electrode; and
an arc shield disposed around the movable-side electrode and the fixed-side electrode,
wherein a linear resistive layer and a nonlinear resistive layer are disposed so as to cover at least a part of a periphery of the insulation container, and
a resistivity of the nonlinear resistive layer, when an applied electric field is less than an operating electric field, is higher than a resistivity of the linear resistive layer.

12. The vacuum interrupter according to claim 11, wherein the resistivity of the nonlinear resistive layer and the resistivity of the linear resistive layer are $10^9$ Ωm or more.

13. The vacuum interrupter according to claim 11, wherein
a magnitude relationship of each resistivity is R1>R3>R2, where R1 is the resistivity of the nonlinear resistive layer when the applied electric field is less than the operating electric field R2 is a resistivity of the nonlinear resistive layer when a lightning impulse is applied R2 is less than an impedance of a vacuum valve when the lighting impulse is applied, and R3 is the resistivity of the linear resistive layer.

14. The vacuum interrupter according to claim 11, wherein the linear resistive layer and the nonlinear resistive layer are laminated and disposed around the insulation container.

15. The vacuum interrupter according to claim 11, wherein the linear resistive layer is disposed on an inner surface of the insulation container, and the non-linear resistive layer is disposed on an outer surface of the insulation container.

16. The vacuum interrupter according to claim 15, wherein a metal layer is further formed on the outer surface of the insulation container.

17. The vacuum interrupter according to claim 16, wherein the nonlinear resistive layer is placed over an end portion of the metal layer.

18. The vacuum interrupter according to claim 11, wherein the insulation container includes a first fixed-electrode-side insulating member, a second fixed-electrode-side insulating member, a first movable-electrode-side insulating member, and a second movable-electrode-side insulating member, and the linear resistive layer is disposed on an inner surface of the insulation container and the nonlinear resistive layer is disposed on an outer surface of the insulation container, such that the linear resistive layer and the nonlinear resistive layer cover around the first fixed-electrode-side insulating member disposed on the fixed-side end plate-side and the second movable-electrode-side insulating member disposed on the movable-side end plate-side.

19. The vacuum interrupter according to claim 11, wherein the linear resistive layer is a metal or a metal compound containing at least one of Cu, Ag, Cr, Ni, Mo, W, V, Nb, and Ta.

20. The vacuum interrupter according to claim 11, wherein the nonlinear resistive layer is any one of zinc oxide and silicon carbide.

* * * * *